US008872668B2

(12) United States Patent
Schnare

(10) Patent No.: US 8,872,668 B2
(45) Date of Patent: Oct. 28, 2014

(54) SYSTEM AND METHOD FOR LOOSE NUT DETECTION

(75) Inventor: Gordon Graham Schnare, Vernon (CA)

(73) Assignee: SST Wireless Inc., Delta (CA)

( * ) Notice: Subject to any disclaimer, the term of this patent is extended or adjusted under 35 U.S.C. 154(b) by 141 days.

(21) Appl. No.: 13/596,986

(22) Filed: Aug. 28, 2012

(65) Prior Publication Data

US 2013/0049952 A1    Feb. 28, 2013

Related U.S. Application Data

(60) Provisional application No. 61/529,080, filed on Aug. 30, 2011.

(51) Int. Cl.
G08B 21/00 (2006.01)
F16B 31/02 (2006.01)
(52) U.S. Cl.
CPC .................................... F16B 31/02 (2013.01)
USPC ...................... 340/686.2; 340/687; 340/686.1
(58) Field of Classification Search
CPC combination set(s) only.
See application file for complete search history.

(56) References Cited

U.S. PATENT DOCUMENTS

| 4,151,655 | A * | 5/1979 | Makarainen ............... 33/203.18 |
| 4,709,654 | A | 12/1987 | Smith |
| 4,862,746 | A | 9/1989 | Komatsu |
| 5,959,365 | A | 9/1999 | Mantini et al. |
| 7,012,511 | B2 | 3/2006 | Hayes |
| 7,994,901 | B2 | 8/2011 | Malis et al. |
| 2008/0129311 | A1 * | 6/2008 | Schuster et al. ............... 324/538 |

* cited by examiner

*Primary Examiner* — Travis Hunnings
(74) *Attorney, Agent, or Firm* — Oyen Wiggs Green & Mutala LLP

(57) ABSTRACT

One illustrative embodiment includes an apparatus for detecting if a fastener moves from a first position to a different second position. The apparatus includes a first connector for connecting a first side of a contact bridge to the fastener for movement in response to movement of the fastener, and a second connector for connecting a second side of the contact bridge to an object to remain stationary relative to the object. One of the first and second sides of the contact bridge includes first and second spaced apart electrical conductors; the other side includes a third electrical conductor. The third electrical conductor is positionable to contact the first and second electrical conductors when the fastener is in the first position, and the third electrical conductor may be spaced apart from at least one of the first and second electrical conductors when the fastener is in the second position.

19 Claims, 16 Drawing Sheets

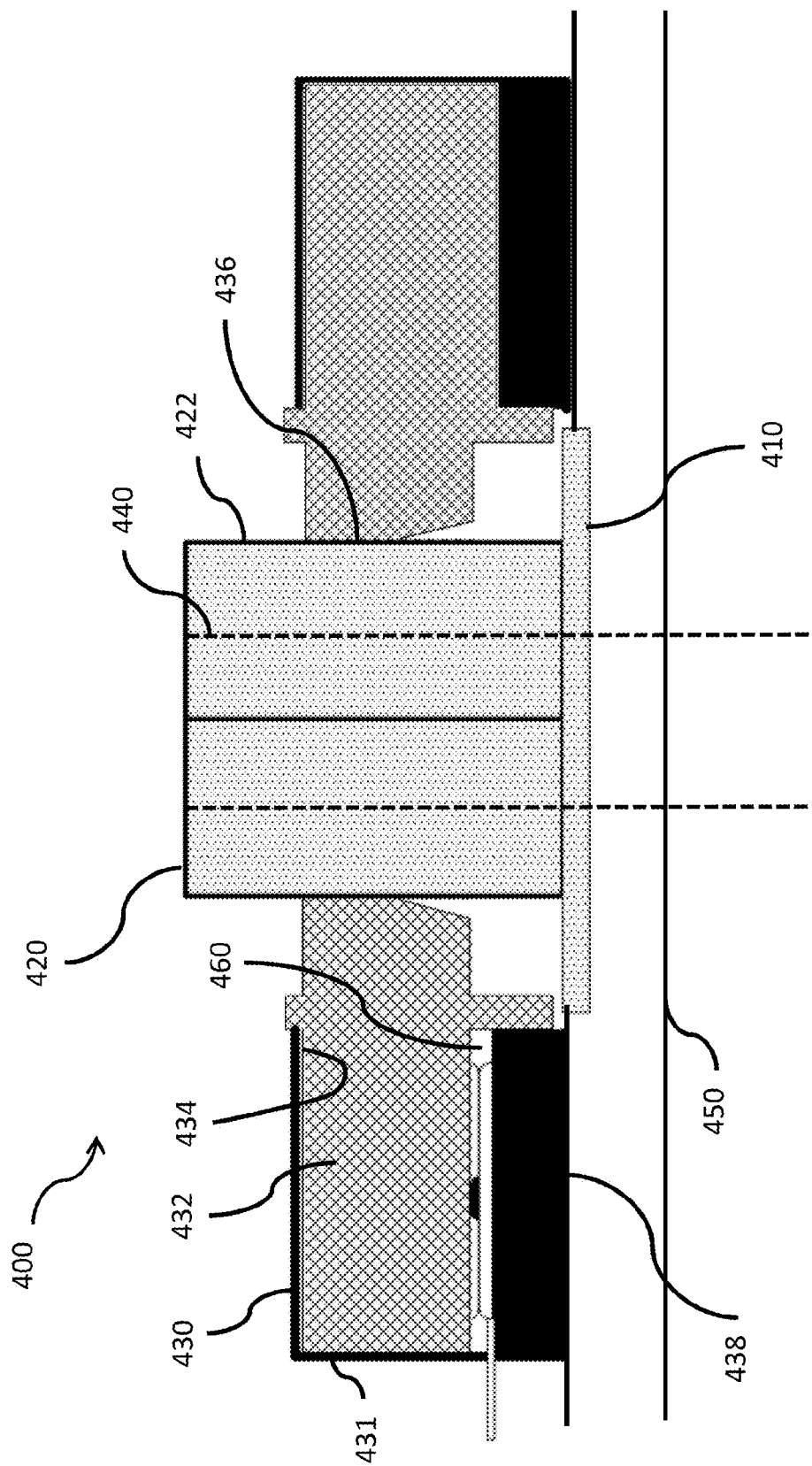

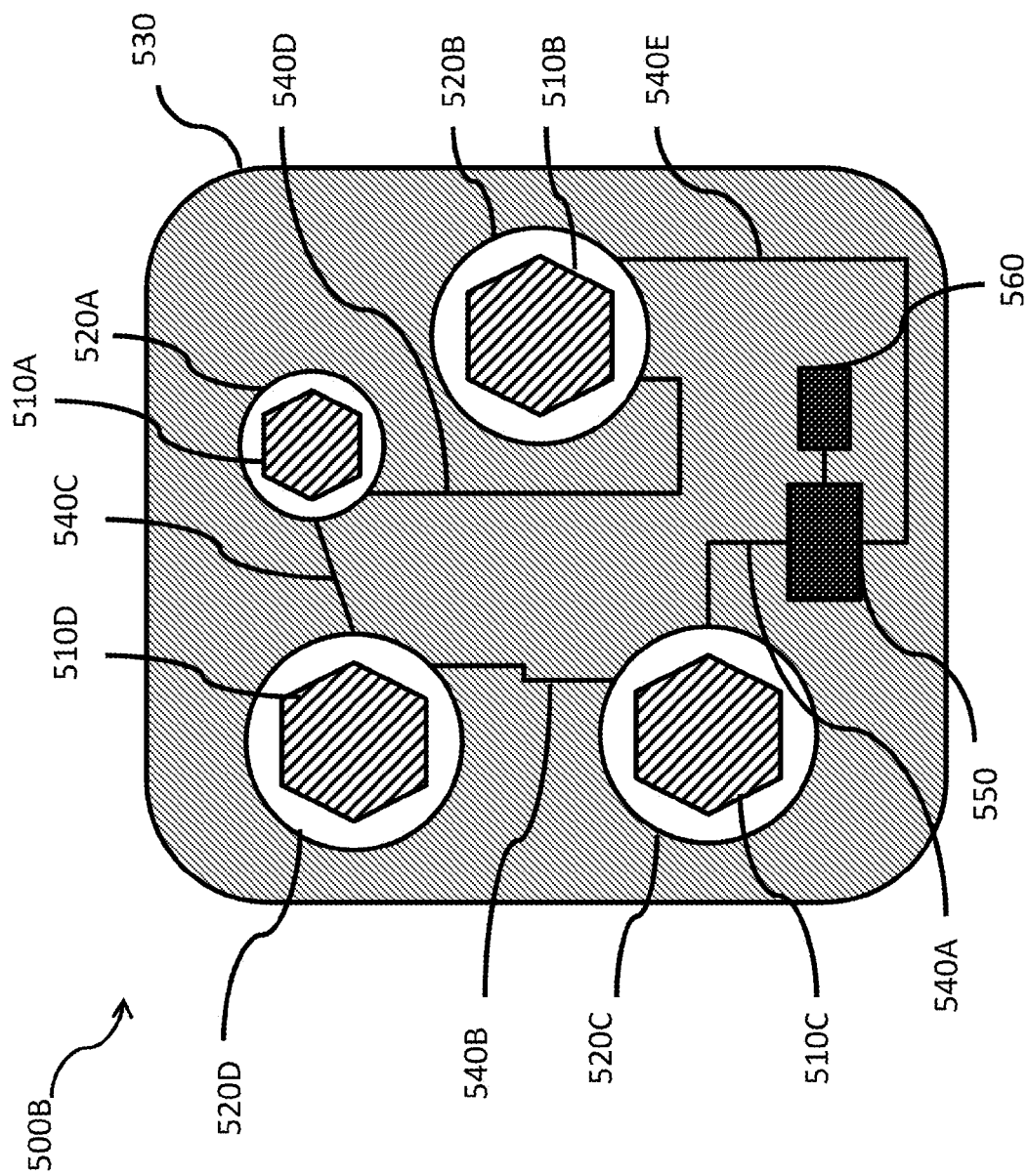

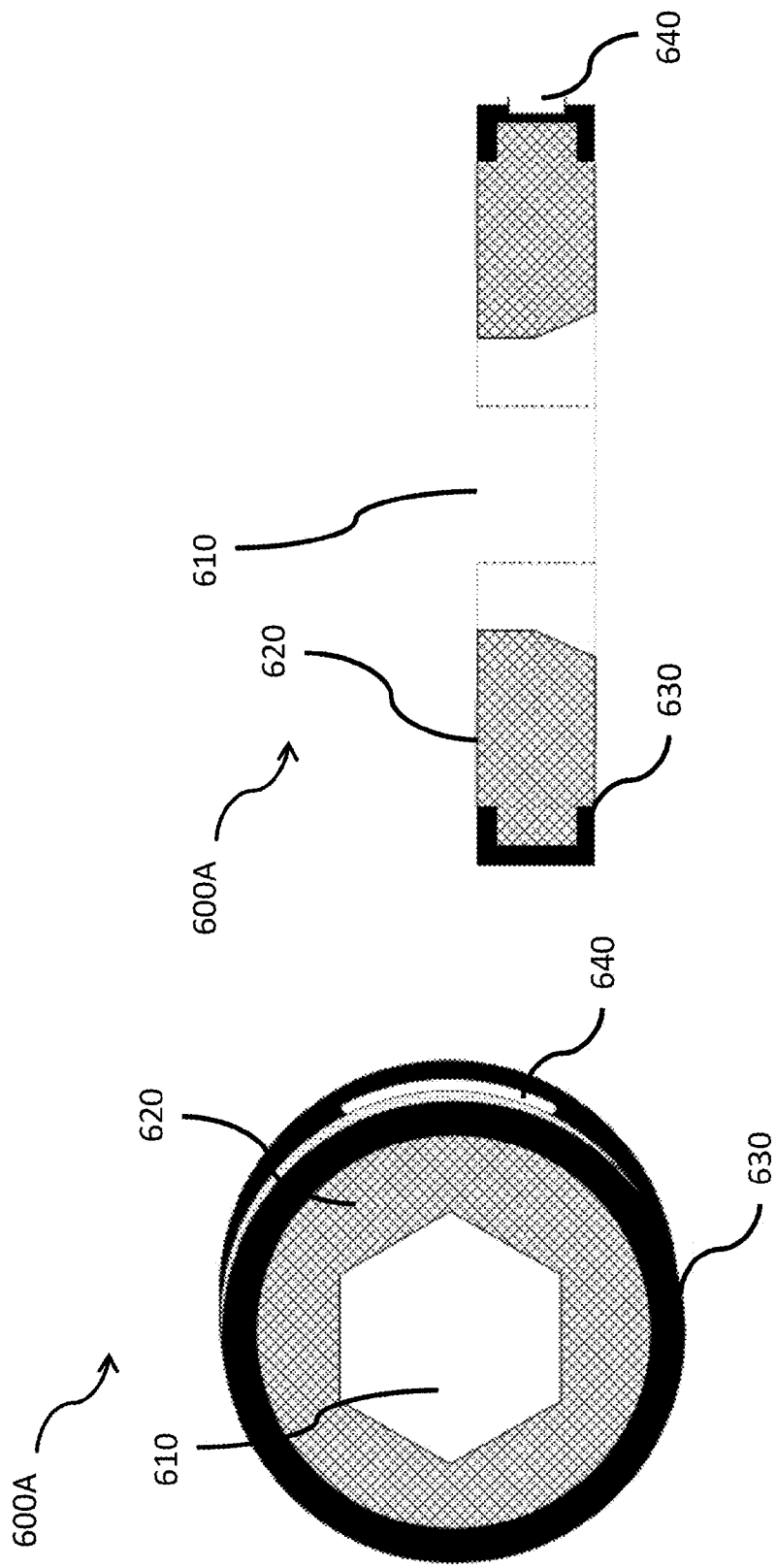

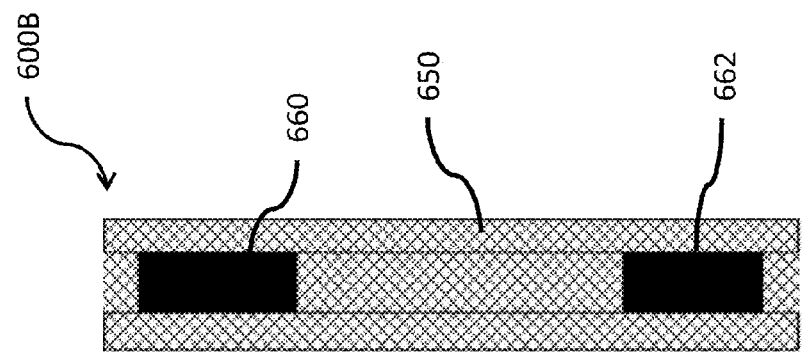
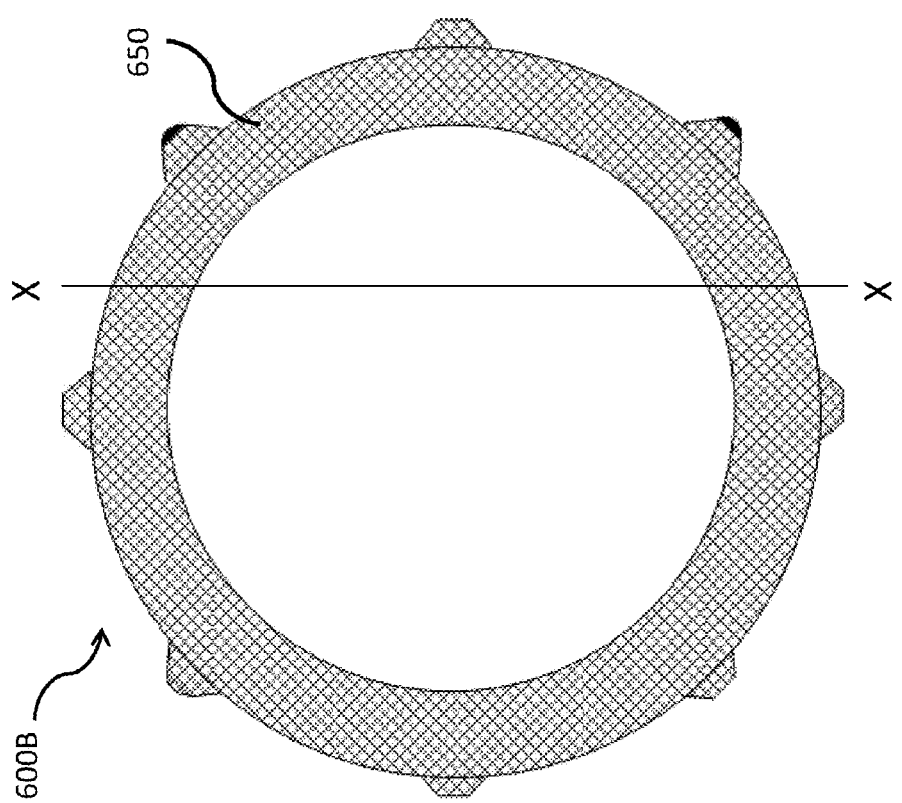
FIGURE 6D
FIGURE 6C

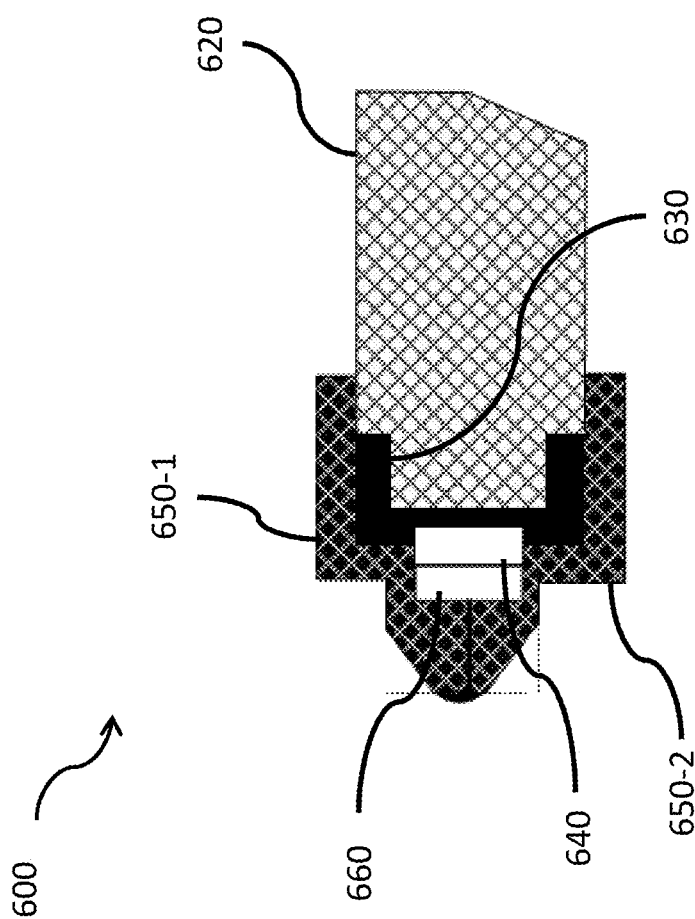

SYSTEM AND METHOD FOR LOOSE NUT DETECTION

CROSS-REFERENCE TO RELATED APPLICATION

This application claims the benefit under 35 USC 119 of U.S. patent application No. 61/529,080 filed on 30 Aug. 2011 and entitled APPARATUSES FOR DETECTING IF A FASTENER MOVES, AND SENSOR ASSEMBLIES INCLUDING SAME.

TECHNICAL FIELD

The invention relates to systems and methods for the detection and identification of loose fasteners such as nuts or bolts. Certain embodiments provide sensors for detecting if a fastener moves, sensor assemblies and monitoring systems including such sensors and/or methods for monitoring fasteners and/or providing information regarding the status of fasteners.

BACKGROUND

Fasteners such as nuts and bolts may hold together elements of a machine.

A nut, for example, may become loose, which may disadvantageously cause elements of the machine to become separated. Such separation may interfere with operation of the machine or cause damage to the machine or to persons or property near the machine. Known apparatuses for determining whether a nut has become loose include Apparatuses that change colour when a nut has become loose, and sets of arrows or tabs that may be aligned when the nut is tight but become misaligned when the nut has become loose. Such apparatus require visual inspection to determine that a nut is loose, and therefore frequent visual inspection is required. If visual inspection is not sufficiently frequent, a fastener may become loose and thereby cause damage.

In another example of a device for indicating that a nut has become loose (U.S. Pat. No. 4,709,654), movement of the nut relative to an axle stud causes mechanical movement of an indicator under the force of a spring. The indicator moves from a retracted position and protrudes beyond the outer surface of the nut, and can be seen or felt during an inspection. Detection of the loose nut requires visible inspection or inspection by hand.

In the particular case of wheel nuts, looseness of the nuts can be detected by sensing knocking associated with an axle and a wheel hub assembly (U.S. Pat. No. 5,959,365). Signals from the sensors can be used to generate alerts to the driver, for example.

Another known approach is to use a sensor assembly secured to the mounting hub and with a pointer in contact with the wheel, which detects relative motion between the hub and the wheel (U.S. Pat. No. 7,012,511). The housing of the sensor assembly may be made from piezo-ceramic material which generates an electric current proportional to the amount of the deflection.

A pressure sensor may be used to measure the torque relative to a desired value. An example sensor is a piezo-resistive pressure sensor which measures pressure by a change in conductivity of an integrated semiconductor. Another example approach is to use a Hall-effect sensor and a corresponding magnet. Wireless communications may be used between the sensor and a control module (U.S. Pat. No. 7,994,901).

In other applications such as vibration testing, a strain gauge may be used to measure the looseness of nuts tightened onto bolts and shaken loose by vibration (U.S. Pat. No. 4,862,746).

SUMMARY

This invention has a number of aspects. Some aspects provide apparatus for monitoring fasteners (such as nuts or bolts for example) to verify that the fasteners have not become loose and/or to detect when the fasteners have become loose. In some embodiments sensors connected to monitor individual fasteners are in data communication with a central station to which information regarding the operational status of monitored fasteners is relayed. In some embodiments the data communication may be provided by way of wireless communication paths. In some embodiments sensors for monitoring a plurality of fasteners are mounted to a common substrate. Other aspects provide methods for monitoring fasteners. Other aspects provide computer program products comprising tangible media carrying computer program instructions for causing a processor to perform all or part of a method for monitoring one or more fasteners as described herein.

In accordance with one illustrative embodiment, there is provided an apparatus for detecting if a fastener moves from a first position to a different second position relative to an object. The apparatus includes: a first connecting means for connecting a first side of a contact bridge to the fastener for movement in response to movement of the fastener; and a second connecting means for connecting a second side of the contact bridge to the object to remain stationary relative to the object. One of the first and second sides of the contact bridge includes first and second spaced apart electrical conductors, and the other one of the first and second sides of the contact bridge includes a third electrical conductor. When the first connecting means connects the first side of the contact bridge to the fastener for movement in response to movement of the fastener, and when the second connecting means connects the second side of the contact bridge to the object to remain stationary relative to the object, the third electrical conductor is positionable to contact the first and second electrical conductors when the fastener is in the first position, and the third electrical conductor is spaced apart from at least one of the first and second electrical conductors when the fastener is in the second position.

In accordance with another illustrative embodiment, there is provided an apparatus for detecting if a fastener moves from a first position to a different second position relative to an object. The apparatus includes: a first connector for connecting a first side of a contact bridge to the fastener for movement in response to movement of the fastener; and a second connector for connecting a second side of the contact bridge to the object to remain stationary relative to the object. One of the first and second sides of the contact bridge includes first and second spaced apart electrical conductors, and the other one of the first and second sides of the contact bridge includes a third electrical conductor. When the first connector connects the first side of the contact bridge to the fastener for movement in response to movement of the fastener, and when the second connector connects the second side of the contact bridge to the object to remain stationary relative to the object, the third electrical conductor is positionable to contact the first and second electrical conductors when the fastener is in the first position, and the third electrical conductor is spaced apart from at least one of the first and second electrical conductors when the fastener is in the second position.

Another illustrative embodiment provides apparatus for detecting rotation of a fastener relative to an object. The apparatus comprises a first part coupled to a second part for rotation relative to the second part about an axis. The first and second parts are apertured on the axis to receive a fastener (e.g. a bolt or nut). The first part comprises an interface that is detachably connectible to the fastener and is configured to non-rotationally engage the fastener. The interface may, for example, comprise a hexagonal opening for engaging a hexagonal nut or a hexagonal bolt head. A first electrical contact is supported by the interface. The second part comprises a base affixable to the object and a second electrical contact supported by the base. The first and second electrical contacts are arranged such that they are in electrical contact with one another for some rotational positions of the first part relative to the second part and are not in electrical contact with one another for other rotational positions of the first part relative to the second part. A conductivity detector is connected to monitor an electrical conductivity of a current path passing through the first and second electrical conductors.

Another illustrative embodiment provides a method for detecting rotation of a fastener relative to an object. The method comprises monitoring electrical conductivity of a contact bridge having first and second sides, the first side coupled to the fastener and the second side coupled to the object. In some embodiments one of the first and second sides comprises first and second electrical contacts angularly spaced apart by a gap having a first angular width and the other one of the first and second sides comprises a third electrical contact. The third electrical contact having a second angular width greater than the first angular width such that the third electrical contact forms a bridge between the first and second electrical contacts when the fastener is in a first rotational position and the third electrical contact does not bridge between the first and second electrical contacts when the fastener is in a second rotational position different from the first rotational position.

Other aspects and features of embodiments of the present invention will become apparent to those ordinarily skilled in the art upon review of the following description of specific embodiments in conjunction with the accompanying figures.

BRIEF DESCRIPTION OF THE DRAWINGS

The accompanying drawings illustrate non-limiting example embodiments of the invention.

FIG. 4B is a cross-sectional view of the sensor assembly of FIG. 4A, taken along the line V-V in FIG. 4A;

FIG. 5B is a plan view of an embodiment of a "multiple-fastener" sensor assembly.

FIG. 6A is a plan view of a schematic representation of an inner interface part of the sensor assembly;

FIG. 6B is a cross-section through the centre of the inner interface part of the sensor assembly of FIG. 6A;

FIG. 6C is a plan view of a schematic representation of an outer housing of the sensor assembly;

FIG. 6D is a cross-section of the outer housing of the sensor assembly of FIG. 6C, taken along the line X-X in FIG. 6C;

FIG. 6E is a partial cross-section of a sensor assembly showing the inner and outer housings;

DETAILED DESCRIPTION

Throughout the following description specific details are set forth in order to provide a more thorough understanding to persons skilled in the art. However, well known elements may not have been shown or described in detail to avoid unnecessarily obscuring the disclosure. The following description of examples of the technology is not intended to be exhaustive or to limit the system to the precise forms of any example embodiment. Accordingly, the description and drawings are to be regarded in an illustrative, rather than a restrictive, sense.

Figure 1A:
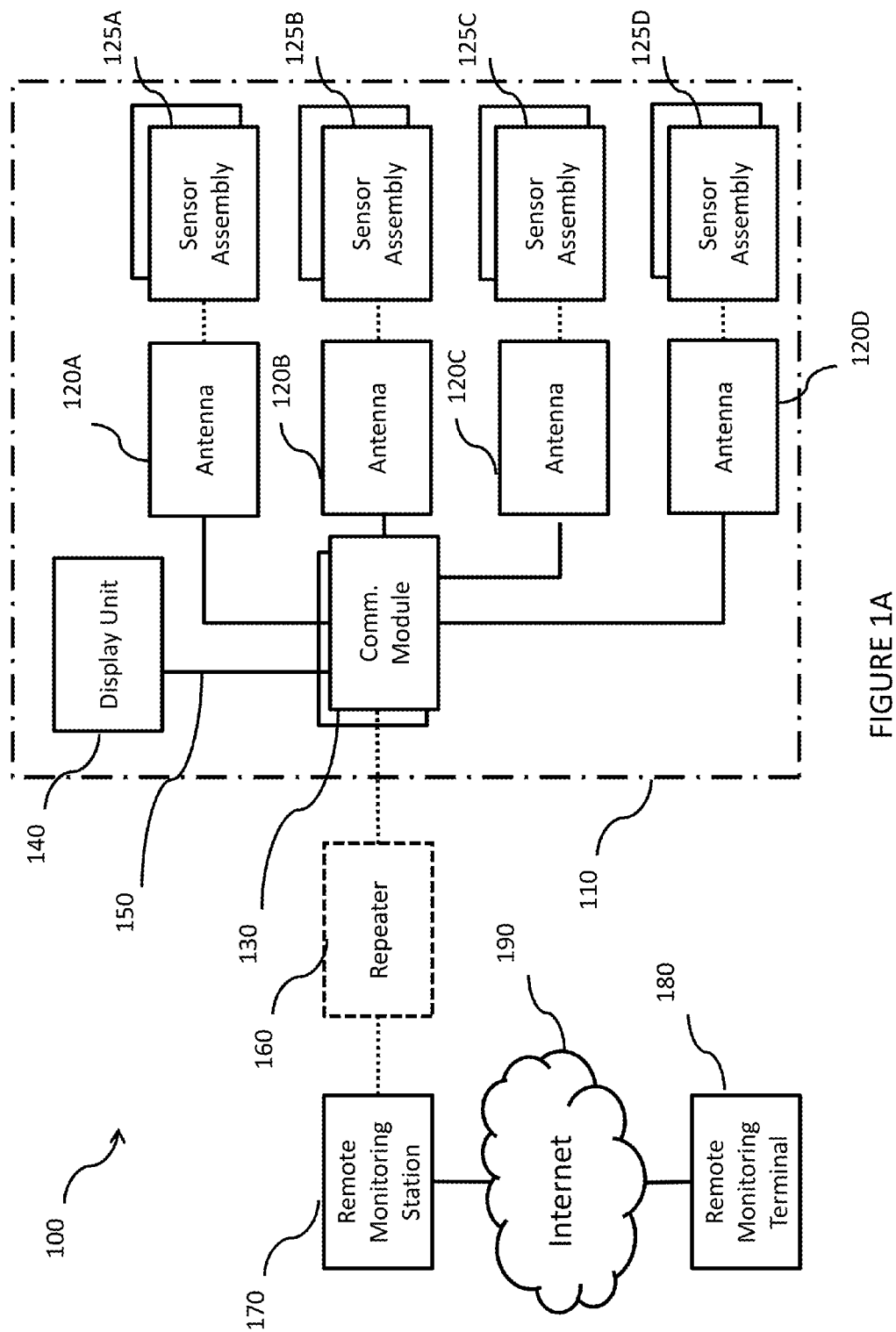
FIG. 1A is a block diagram of an embodiment of an apparatus for detection and identification of a loose fastener.

FIG. 1A is a block diagram of an apparatus 100 according to an example embodiment. Apparatus 100 is configured for detecting and identifying a loose fastener. Embodiments such as apparatus 100 may be used to detect and identify loose fasteners on a machine 110 (or a group of machines) while the machine is in use. Machine 110 may be, for example, a vehicle, a wind turbine or industrial equipment comprising fasteners that may become lose, for example as a result of vibration.

Apparatus 100 comprises a plurality of sensor assemblies 125A-D for measuring the looseness of fasteners. In the example shown, there are four sensor assemblies. Such an apparatus 100 may, for example, be suitable for a vehicle with 4 wheels and one sensor assembly per wheel. Sensor assemblies 125A-D communicate wirelessly with antennas 120A-D (as indicated by the dotted lines). Antennas 120A-D are connected to a communication module 130. Communication module 130 may be mounted on machine 110 or may be nearby machine 110. Each antenna 120A-D may communicate with one or more sensor assemblies. A receiver or transceiver (not shown) in the communication module 130 may be connected to one or more of the antennas. Greater sensitivity can be achieved if each antenna has its own corresponding receiver or transceiver in the communication module 130. In other embodiments a communication module 130 may have a single antenna. Configurations in which apparatus 100 comprises more than one antenna, and optionally one transceiver per antenna, can be beneficial for achieving reliable communication from sensor assemblies (e.g. 125A-D) in noisy environments, or where paths between sensor assemblies and antennas are long or contain obstacles, for example. Alternatively, sensor assemblies 125A-D may be connected by wire, optical fibres or other suitable data communication paths to communication module 130.

As indicated in FIG. 1A, there can be one or more communication modules 130 per machine 110. Each communication module 130 can be connected to one or more antennas (e.g. antennas 120A-D), and each antenna can communicate wirelessly with one or more sensor assemblies (e.g. sensor assemblies 125A-D).

Referring to FIG. 1A, the communication module 130 can communicate wirelessly with a remote monitoring station 170 either directly or via an optional repeater or repeaters 160. The remote monitoring station 170 can communicate with a remote monitoring terminal 180 via a network 190 (such as the Internet, a local area network, a wide area network, a dedicated link or another suitable data communication path).

Signals can be transmitted to a display unit 140 associated with machine 110, regardless of whether machine 110 is in data communication (e.g. within an RF coverage range) of remote monitoring station 170. Signals transmitted to display unit 140 can comprise alert, status and identification information intended for diagnosis and monitoring by an operator. In the case machine 110 is a vehicle, display unit 140 may be located on the dashboard and provide a real-time alert to the driver in the event a loose wheel nut is detected. Display unit 140 may identify the wheel or wheel nut generating the alert.

In some embodiments, the sensor assembly may provide a visual indication that a fastener or nut has become loose, for example a red flashing LED, an alarm sound, and/or other indicator(s).

Figure 1B:
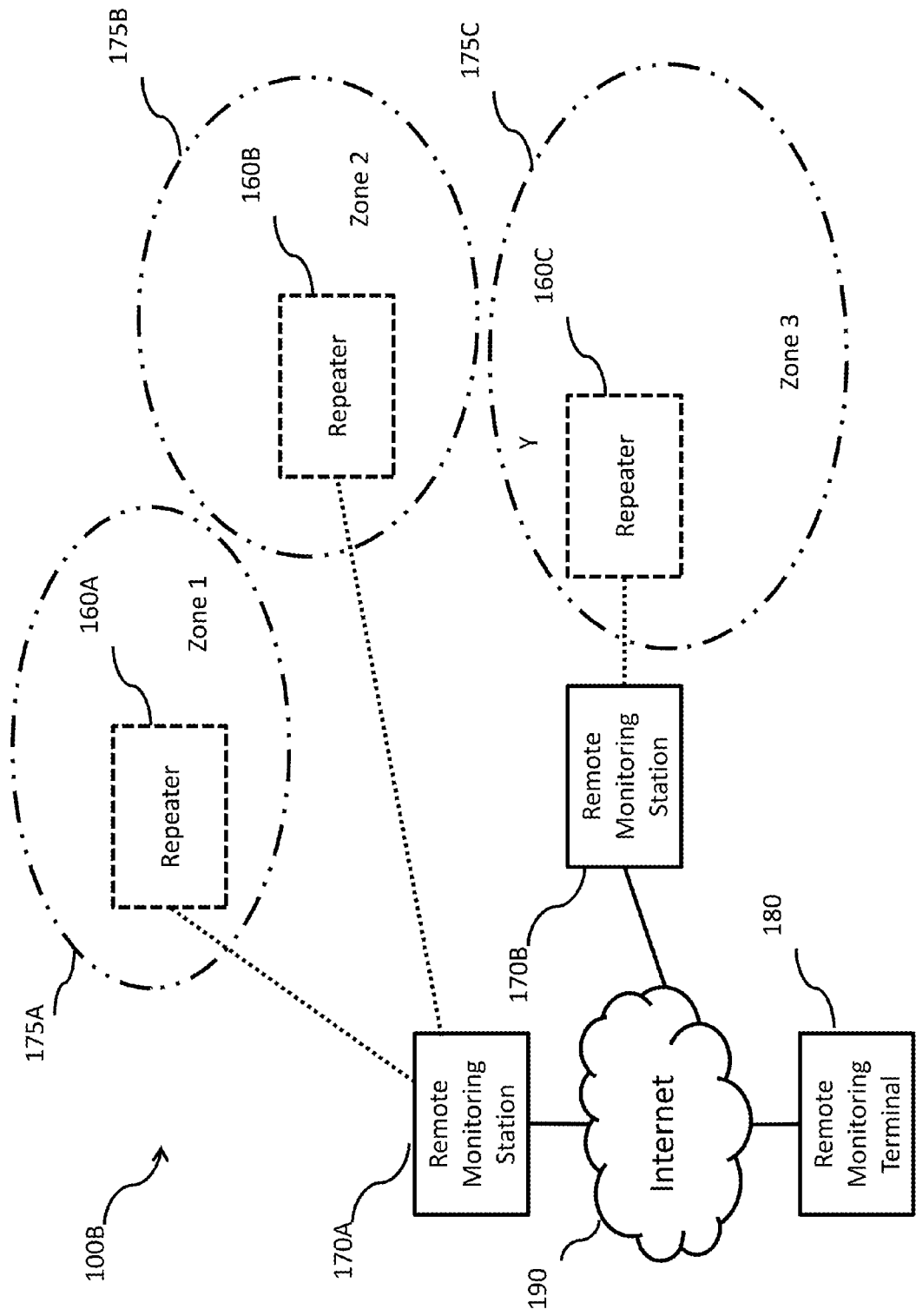
FIG. 1B is a block diagram of an embodiment of a multi-zone wireless monitoring apparatus.

FIG. 1B is a block diagram of an example multi-zone wireless monitoring apparatus 100B. Apparatus 100B comprises the same elements as apparatus 100 from FIG. 1A. Machine 110 and elements of the system on-board the vehicle or other machine including sensor assemblies (e.g. 125A-D), communication module 130 and display unit 140 are not shown in FIG. 1B.

System 110B comprises more than one repeater. The example in FIG. 1B comprises three repeaters 160A-C. Each repeater is associated with an RF coverage zone.

Data can be transferred from remote monitoring stations 170A and 170B to a remote monitoring terminal 180 via a network 190 (such as the Internet, a local area network, a wide area network, a dedicated link or another suitable data communication path). This allows an operator connected to network 190 to monitor real-time information related to the detection and identification of loose fasteners, and to view stored data offloaded from the communication module 130 from FIG. 1A.

Data can be transferred between remote monitoring stations 170A and 170B via a network 190 (such as the Internet, a local area network, a wide area network, a dedicated link or another suitable data communication path).

RF coverage zones are provided by remote monitoring stations 170A and 170B, and by repeaters 160A-C. Other embodiments may have different numbers and configurations of remote monitoring stations and repeaters.

Some embodiments may monitor operational parameters other than the looseness of nuts. For example, some embodiments may monitor tire pressure or tire temperature of a vehicle. In other applications such as industrial machinery some embodiments may monitor ambient temperature, temperatures of machine components or systems, electrical parameters, fluid pressures, acceleration and the like.

One exemplary end-use application of the apparatus illustrated in FIGS. 1A and 1B is the detection and identification of loose wheel nuts on the wheels of a vehicle such as a car, bus, truck or industrial vehicle.

Figure 2:
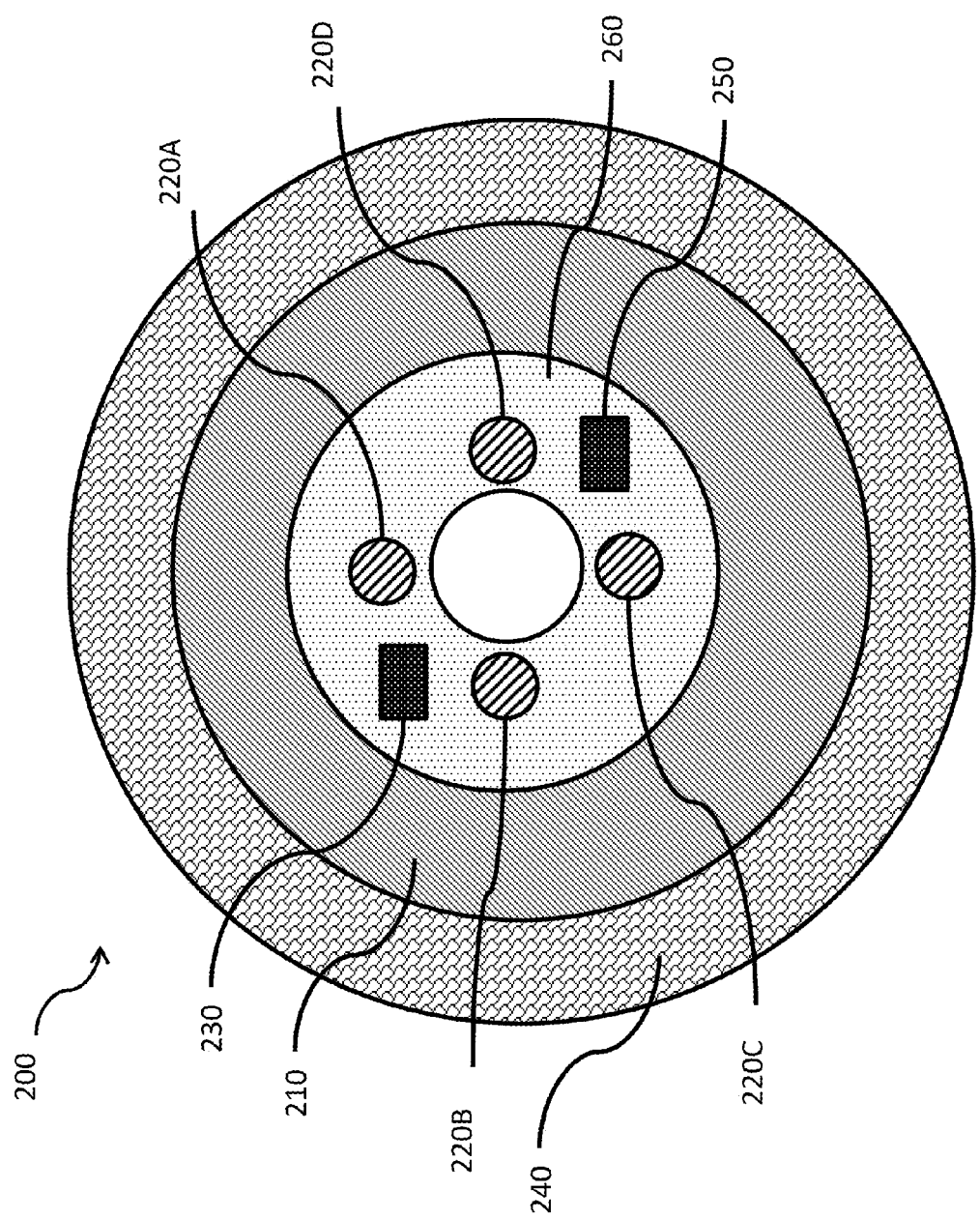
FIG. 2 is a side view of a wheel on a vehicle.

FIG. 2 is a side view of a wheel 200 on a vehicle. Wheel 200 comprises a wheel rim 210 and a tire 240. The wheel 200 is attached to the vehicle by wheel nuts 220A-D. In the embodiment illustrated in FIG. 2, the sensor assembly (such as 125A-D from FIG. 1A) comprises sensor transceiver package 230 and power source 250, optionally mounted on substrate 260. Substrate 260 can, for example, be a plate shaped to conform to the rim 210 with apertures for the wheel nuts 220A-D. Sensor transceiver package 230 and power source 250 can be mounted on substrate 260.

In the embodiment shown in FIG. 2, a single sensor assembly may detect and identify if any of the connected wheel nuts becomes loose. The single sensor assembly illustrated in FIG. 2 has separate sensor parts that each monitors a corresponding wheel nut and a shared communications part (sensor transceiver package 230) that relays information from all the sensor parts to the communication module 130 from FIG. 1. The sensor transceiver package 230 may optionally detect which (if any) of the wheel nuts 220A-D has become loose and identify the loose wheel nut in its transmission to the communication module 130. In alternative embodiments sensor transceiver package 230 transmits data that is processed at a downstream location to determine whether any of the wheel nuts 220A-D has become loose.

Sensor transceiver package 230 may detect which wheel nut has become loose by measuring a condition such as electrical conductivity that differentiates between loose wheel nuts. Alternatively, a separate sensor assembly may be used for each wheel nut. Sensor transceiver package 230 communicates wirelessly with at least one antenna (such as 120A-D from FIG. 1A) and communication module 130 from FIG. 1A.

A second exemplary end-use application of the apparatus illustrated in FIGS. 1A and 1B is the detection and identification of loose nuts in a stationary machine such as a wind turbine.

Figure 3A:
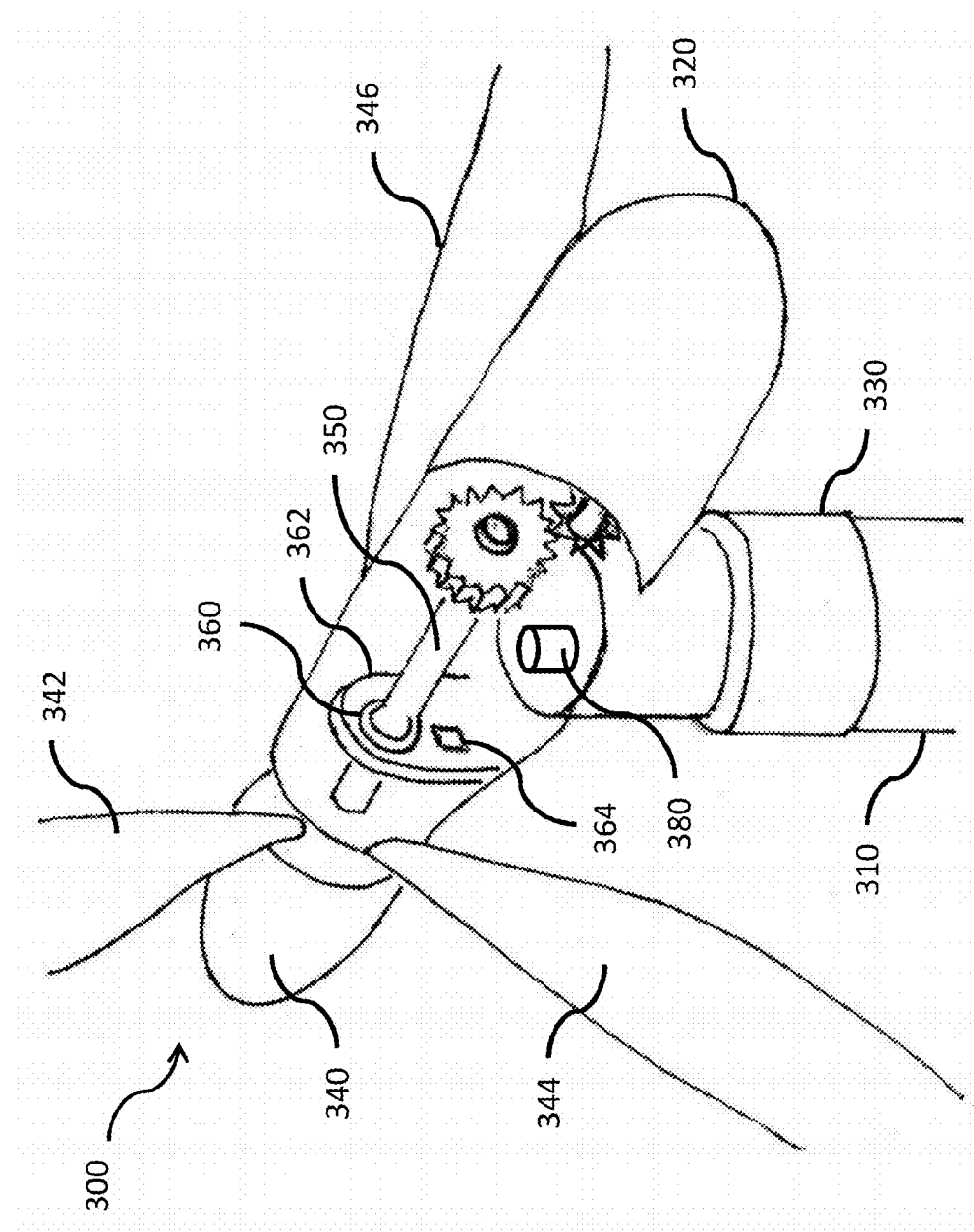
FIG. 3A is a cutaway oblique view of a wind turbine.

FIG. 3A is a cutaway oblique view of a wind turbine. The wind turbine 300 includes a tower 310, and a nacelle 320 rotatably mounted to the tower 310 on a yaw bearing 330 for rotation about a generally vertical yaw axis. The wind turbine 300 also includes a rotor 340 carrying three blades 342, 344, and 346 in the embodiment shown.

Wind turbine 300 also includes a main shaft 350 coupled, at a first end, to the rotor 340. The wind turbine 300 also includes a main bearing 360 mounted on a bearing mount 362. The main bearing 360 rotatably holds the main shaft 350, and thus the rotor 340 and blades 342, 344, and 346, on the nacelle 320. The bearing mount 362 also holds an acceleration sensor assembly 364 comprising an acceleration sensor that measures acceleration, and thus vibration, of the bearing mount 362, which may also more generally be referred to as an element of the wind turbine 102. In alternative embodiments, the acceleration sensor assembly 364 may be positioned on the main shaft 350, and the main shaft in such alternative embodiments may also more generally be referred to as an element of the wind turbine 300.

Figure 3B:
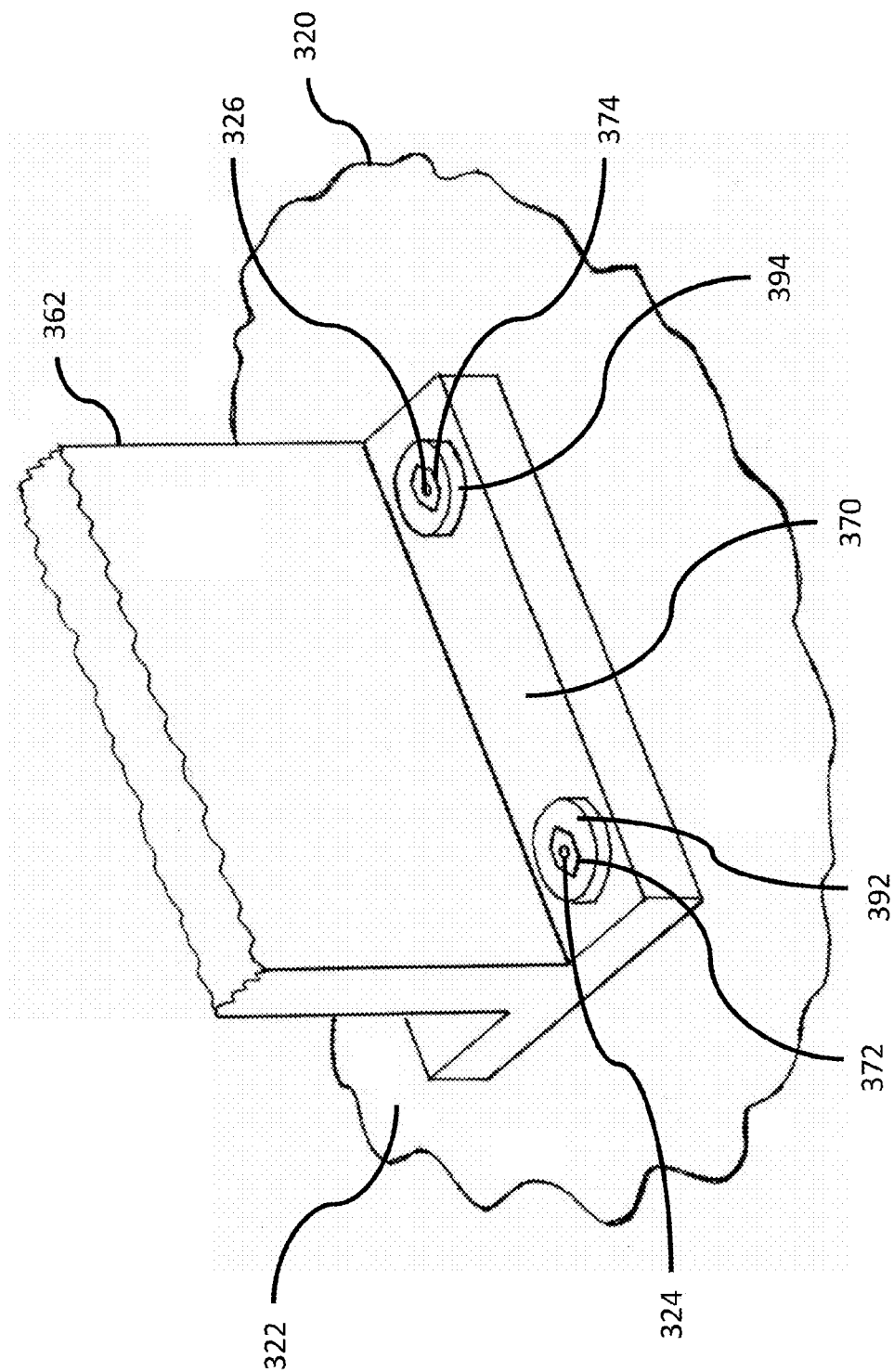
FIG. 3B is an oblique view of a mounting flange of the wind turbine of FIG. 3.

FIG. 3B is an oblique view of a mounting flange of the wind turbine of FIG. 3A. Referring to FIG. 3B, the bearing mount 362 in the embodiment shown includes a mounting flange 370 mounted to an inner surface 322 of the nacelle 320 by a plurality of fasteners including nuts 372 and 374 coupled to respective bolts 324 and 326 on the nacelle 320. The nuts 372 and 374 hold the bearing mount 362, and thus the main shaft 350, rotor 340, and blades 342, 344, and 346 relative to the nacelle 320, and thus it is important to know if one or more of the nuts 372 and 374 become loose. Therefore, the embodiment shown includes sensor assemblies 392 and 394 coupled to the nuts 372 and 374 respectively.

The wind turbine 300 is exemplary only. Alternative embodiments may include numerous variations, such as alternative means for rotating the nacelle 320 about the yaw axis, and alternative fasteners to the nuts 372 and 374, for example. Further, the wind turbine may include one or more additional sensor assemblies or proximate pitch bearings (not shown) that allow the blades 342, 344, and 346 to rotate along longitudinal axes of the blades to adjust pitch of the blades, or proximate pinion gears (not shown) in ring gears (not shown) of the blades 342, 344, and 346 that can be rotated by motors (not shown) to cause such pitch adjustment of the blades, for example.

Figure 4A:
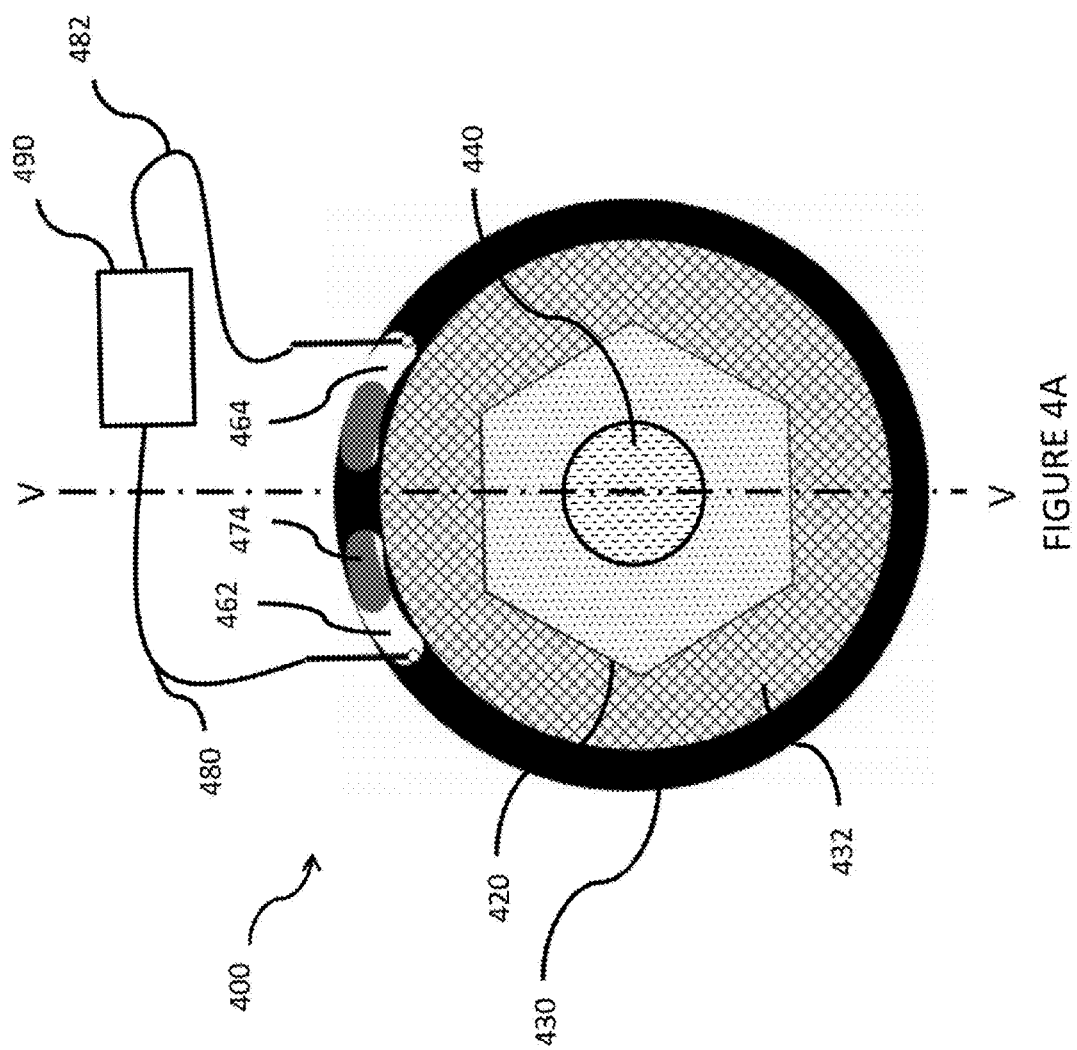
FIG. 4A is an enlarged plan view of a sensor assembly of the wind turbine of FIG. 3.

Referring to FIGS. 4A and 4B, a nut washer 410 is positioned between the nut 420 and a mounting flange 450 (such as the mounting flange 370 from FIG. 3B). Nut 420 may more generally be referred to as a fastener that is rotatable relative to the mounting flange 450. The sensor assembly 400 includes a generally-cylindrical housing 430, and an interface 432. The housing 430 and the interface 432 in the embodiment shown are formed of an electrically-insulating thermoplastic material. The housing 430 defines a generally-annular inward-facing cavity in which the interface 432 is positioned and held for rotation therein. In the embodiment shown, a narrow space between the housing 430 and the interface 432 is filled with an electrically-insulating lubricant 434.

The interface 432 is generally annular and has an inner surface 436 generally complementary to a hexagonal outer surface 422 of the nut 420. The inner surface 436 is sized to fit tightly on the outer surface 422 such that the interface 432 rotates with the nut 420 around the bolt 440. A bottom surface 438 of the housing 430 is fixed on the mounting flange 450 such that the housing remains stationary relative to the mounting flange 450 and does not rotate around the bolt 440 even if the nut 420 does rotate around the bolt 440. Bottom surface 438 of the housing 430 may be fixed on the mounting flange by any suitable means of attachment such as adhesive, one or more screws or other fasteners, suitable clips, snaps, clamps, or the like. In some embodiments, where for example the sensor assembly is fixed to more than one nut (such as illustrated in FIG. 2), it may not be necessary to fix the bottom surface 438 of the housing 430 to the mounting flange 450 from FIG. 4B, or in the case of a wheel, to the wheel hub 210 from FIG. 2. In some embodiments, two or more sensors have a shared bottom surface 438. The sensors can all be mounted on a plate (for example substrate 260 from FIG. 2) having apertures for the wheel nuts. The orientation of the plate is therefore fixed by its engagement with the wheel nuts and therefore no other fixing means may be necessary.

Figure 4C:
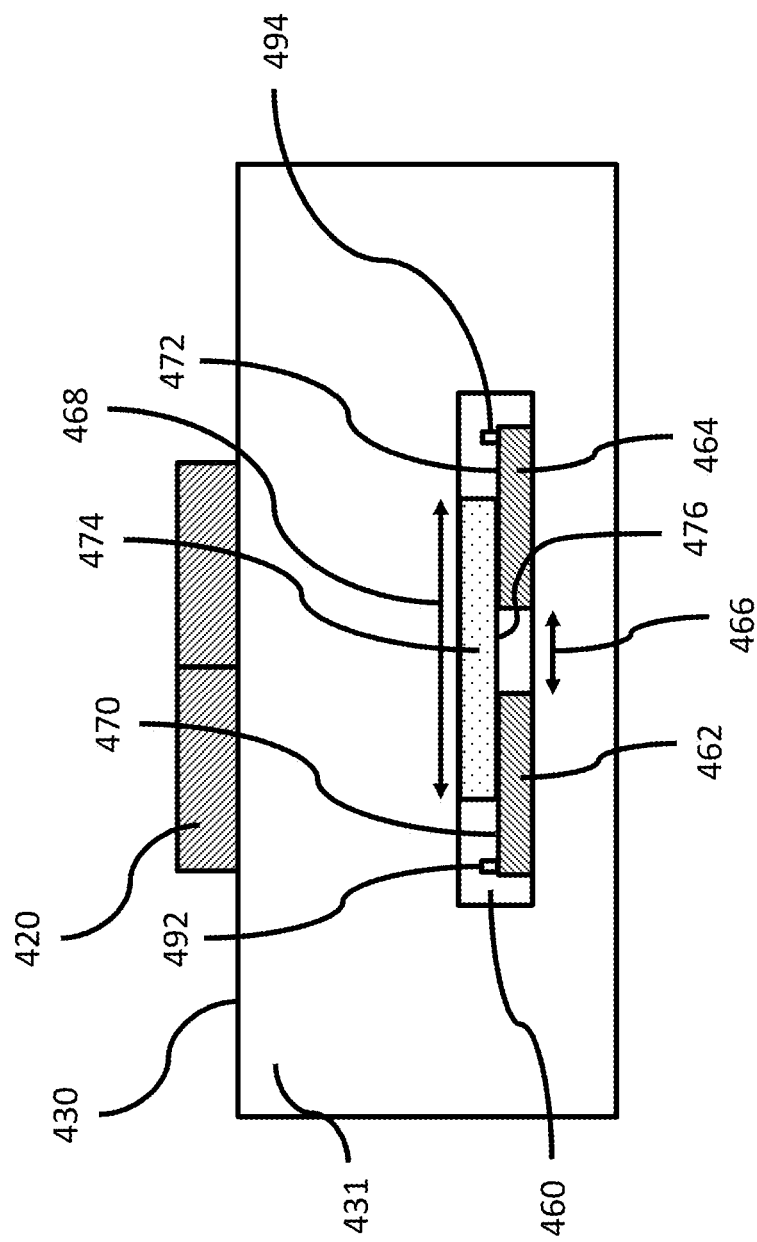
FIG. 4C is a side view of the sensor assembly of FIG. 4A.

The housing 430 and the interface 432 define a cavity 460 therebetween that is open at a peripheral outer surface 431 of the housing 430 as illustrated in FIG. 4C (a side view of sensor assembly 400). In the cavity 460, the housing 430 is coupled mechanically to support first and second electrical conductors 462 and 464 spaced apart by a peripheral spacing distance 466 and having respective contact surfaces 470 and 472 facing into the cavity 460 and towards the interface 432. Also, interface 432 is coupled to support a third electrical conductor 474 having a contact surface 476 facing into the cavity 460 and towards the first and second electrical conductors 462 and 464. The third electrical conductor 474 has a peripheral width 468 greater than the peripheral spacing distance 466.

In the embodiment shown, the contact surfaces 470, 472, and 476 are all generally in a common plane such that rotation of the interface 432 in the inward-facing cavity of the housing 430 causes the contact surface 476 of the third electrical conductor 474 to slide in a peripheral direction over one or both of the contact surfaces 470 and 472 of the first and second electrical conductors 462 and 464. Thus it is possible to rotate the interface 432 in the housing 430 such that the contact surface 476 contacts both of the contact surfaces 470 and 472, as shown in FIGS. 4A and 4B. Thus, when sensor assembly 400 is in the configuration shown in FIGS. 4A and 4B, the first, second, and third electrical conductors 462, 464, and 474 are all in electrically conductive communication, and electric current can flow therebetween.

The first electrical conductor 462 is electrically connected to a first electrically conductive lead 480, and the second electrical conductor 464 is electrically connected to a second electrically conductive lead 482. The first and second electrically conductive leads 480 and 482 are connected to a conductivity detector 490, which detects whether current can pass from one of the first and second electrically conductive leads 480 and 482 to the other, through the first, second, and third electrical conductors 462, 464, and 474. The conductivity detector may, for example, monitor an electrical current passing through the contact bridge. The current may be supplied by a power source that is internal to or external to conductivity detector 490.

In one embodiment, the nut 420 may be tightened on the bolt 440 and on the nut washer 410 to a desired tightness, such as to a desired torque using a torque wrench, for example, and the nut 420 may be considered to be in a desired position when tightened to such a desired tightness, or more generally the nut 420 may be considered to be in a first position. The sensor assembly 400 may then be positioned on the mounting flange 450 such that a bottom surface 438 of the housing 430 is fixed on the mounting flange 450 and the first, second, and third electrical conductors 462, 464, and 474 are all in electrically conductive communication. The conductivity detector 490 can thus detect current between the first and second electrically conductive leads 480 and 482.

However, the nut 420 may become loose, or otherwise move relative to the mounting flange 450 to an undesired position (or more generally, a second position) different from the desired (or first) position mentioned above, and thereby rotate about the bolt 440. In the embodiment shown, such rotation of the nut 420 causes substantially-equivalent rotation of the interface 432 relative to housing 430, which causes the contact surface 476 of the third electrical conductor 474 to slide in a peripheral direction over the contact surfaces 470 and 472 of the first and second electrical conductors 462 and 464. If the interface 432 rotates a sufficient amount relative to the housing 430, then the third electrical conductor 474 will become spaced apart from at least one of the first and second electrical conductors 462 and 464, and thus electrical communication between the first and second electrically conductive leads 480 and 482 becomes broken. The first, second, and third electrical conductors 462, 464, and 474 thus function as a contact bridge having a conductivity that may vary in response to a position of the interface 432 relative to the housing 430, and thus a conductivity that varies in response to movement of the nut 420 relative to the bolt 440. Part of the contact bridge (e.g. the first and second electrical conductors 462 and 464) is held by the housing 430, and part of the contact bridge (e.g. the third electrical conductor 474) is held by the interface 432. However, in alternative embodiments, the contact bridge may be reversed such that the first and second electrical conductors 462 and 464 are held by the interface 432, and the third electrical conductor 474 is held by the housing 430. Therefore, more generally, the contact bridge has first and second sides, one of the first and second sides of the contact bridge includes the first and second electrical conductors 462 and 464, and the other one of the first and second sides of the contact bridge includes the third electrical conductor 474.

As indicated above in the embodiment shown, the interface 432 holds one side of the contact bridge, and also rotates with the nut 420 around the bolt 440, and thus the interface 432 may be referred to as a connector that connects a first side of a contact bridge to a fastener (the nut 420 in the embodiment shown) for movement in response to movement of the fastener.

Also, as indicated above in the embodiment shown, the housing 430 holds one side of the contact bridge, and is also fixed on the mounting flange 450 such that the housing remains stationary relative to the mounting flange 450 and does not rotate around the bolt 440 even if the nut 420 does rotate around the bolt 440, and thus the housing 430 may be referred to as a connector that connects a second side of the contact bridge to an object (the mounting flange 450 in the embodiment shown) to remain stationary relative to the object.

In general, the housing 430 and the interface 432 may cooperate to change a conductivity measurable by the conductivity detector 490 in response to loosening of the nut 420 from a relatively tightened position, and thus in general the housing 430 and the interface 432 may function as an apparatus to detect if the nut 420 moves from a desirable position (the relatively tightened position in the embodiment shown) to an undesirable position (e.g. a relatively loosened position) relative to an object (the mounting flange 450 in the embodiment shown).

The first, second, and third electrical conductors 462, 464, and 474 may be made of any conductive material or materials, and in some embodiments may include magnetic materials or conductive magnetic materials to urge magnetically the third electrical conductor 474 against the first and second electrical conductors 462 and 464, thereby enhancing contact between the first, second, and third electrical conductors 462, 464, and 474 when the interface 432 is positioned in the housing 430 such that the third electrical conductor 474 is proximate the first and second electrical conductors 462 and 464. In the alternative, separate magnets/magnetic materials may be provided in the housing and the interface and arranged to urge the conductor(s) of the interface against the conductor(s) of the housing.

The first and second electrical conductors 462 and 464 include respective safety nubs 492 and 494 projecting from the contact surfaces 470 and 472 respectively. The safety nubs 492 and 494 (illustrated in FIG. 4C) extend into the path of the third electrical conductor 474 and may limit rotation of the interface 432 within the housing 430. In some embodiments, the peripheral width 468 may exceed the peripheral spacing distance 466 by a sufficient amount such that if the housing 430 is in a predetermined position and the nut 420 is tightened to a desired position, the interface 432 may be positioned to receive the nut 420 such that the first, second, and third electrical conductors 462, 464, and 474 are all in electrically conductive communication. For example, in one embodiment, the peripheral width 468 may exceed the peripheral spacing distance 466 by a sufficient amount such that the first, second, and third electrical conductors 462, 464, and 474 remain in electrically conductive communication when the interface 432 is rotated within the housing 430 by at least an appropriate angle such as 45° or 60°, for example. The embodiment shown therefore permits some movement of the nut 420 relative to the bolt 440 before conductivity across the contact bridge is lost, thereby permitting the sensor assembly 400 to be positioned on the nut 420, with the electrical conductors 462, 464, and 474 in electrically conductive communication, regardless of a particular orientation that the nut 420 may have when the nut 420 is tightened. In other words, in the embodiment shown, the third electrical conductor 474 is positionable to contact the first and second electrical conductors 462 and 464 when the nut 420 is in a first position, and the third electrical conductor 474 is spaced apart from at least one of the first and second electrical conductors 462 and 464 when the nut 420 has rotated to a second position different from the first position.

Other embodiments may include single contact points instead of a contact bridge. For example, some embodiments, may have two conductors—one contact point on the housing and another on the interface. A conductivity monitor may detect rotation of a fastener by monitoring the electrical conductivity between the contact point on the housing and the contact point on the interface. Alternatively, the third conductor may be broken into two contacts separated by a gap and connected by a wire or other suitable electrically conducting means. Still other embodiments may include contact bridges designed to permit a predetermined amount of movement before electrical conductivity of the contact bridge changes so as to indicate a loose fastener.

After a fastener is loosened and then re-torqued, it may be in a new position after being re-torqued. The sensor assembly may be removed and re-attached to adjust the relative positioning of the first and second electrical conductors on the one hand and the third electrical conductor on the other hand to improve performance of the sensor assembly.

The angular extents of the first, second and third electrical conductors may be chosen such that a sensor assembly 400 can provide a detectable change in electrical conductivity if the fastener rotates to a position outside of a desired range of rotational positions of the nut, and to be robust with respect to positioning. For example, in the case of a hexagonal nut, the first, second and third electrical conductors may span approximately 60 degrees (or $\frac{1}{6}^{th}$ of a full rotation) to accommodate different rotational positions of the nut when torqued or re-torqued to a desired value.

It can be appreciated that a sensor assembly 400 can be made by appropriate selection of the configuration of the first, second and third electrical conductors to be sensitive to rotation of a fastener through a desired range. For example, in some applications it is desirable to ensure that a signal will be generated if a monitored fastener rotates more than, for example, 90 degrees or 180 degrees from its position when properly tightened. A sensor assembly 400 can be made to ensure that such rotations can be detected. For example, in embodiments where the third electrical conductor spans approximately 60 degrees the apparatus can be made to be sensitive to relative rotations of the nut of between a few degrees and almost 60 degrees depending on the span of the gap separating the first and second electrical conductors. The apparatus may detect both clockwise and counter-clockwise rotations of the nut.

The illustrated embodiments illustrate example geometries and shapes of the contacts and contact bridge. Any other suitable geometries and shapes may be used. For example, the contacts may be located on an outer cylindrical surface rather than in a plane perpendicular to the bolt. Contacts may connect to make a low-resistance DC current path as illustrated. Alternatively, contacts may be configured to sense proximity of each other, for example by monitoring an AC signal capacitively-coupled when the contacts overlap with each other.

The contacts are electrically conducting, and may optionally be magnetic to help provide more robust attachment between each other when in contact.

In some embodiments, the first, second and third electrical conductors act essentially as a switch, which exhibits electrical conductivity when the third electrical conductor is in electrical contact with both of the first and second electrical conductors and much lower electrical conductivity otherwise. In other embodiments rotation of the sensor assembly results in a varying electrical characteristic, such as a varying resistance or a varying impedance or a varying capacitance etc. One approach to sensing rotation of a fastener is to measure the electrical characteristic when the fastener is in a desired position (e.g. properly tightened), record the value of the electrical characteristic (e.g. in a data store in the system—the data store may be located in the sensor transceiver package or in another part of the system). In operation the system may periodically monitor the electrical characteristic. If the fastener loosens, a change in the electrical characteristic relative to the stored value will be detected. A warning signal may be generated and a warning indicator may be operated in the case that a difference between a measured value of the electrical characteristic and the stored value exceeds a threshold.

In some embodiments, the sensitivity of the monitoring apparatus to movement of the fastener may be increased by performing calibration of the sensor assemblies. Calibration may be achieved, for example, by determining exactly where on the contact pads the bridge resides for different values of the electrical characteristic and then recording this in a table accessible to a CPU in the sensor transceiver package. A sensitivity of better than 10 degrees may be achieved through suitable calibration.

Also, although the sensor assembly 400 in the embodiment shown is adapted to mount to a six-sided hexagonal fastener such as nut 420, one skilled in the art will appreciate that the sensor assembly 400 may be varied for other rotatable fasteners such as rotatable four- or five-sided nuts, Torx™ fasteners, or linearly movable fasteners such as pins, for example. In an embodiment adapted for monitoring linearly movable fasteners the first, second and third electrical conductors may be configured to be co-linear along the line of movement of the fastener. If there is sufficient movement of the fastener, then contact between one of the first and second electrical conductors and the third electrical conductor will break the contact bridge.

One skilled in the art will appreciate that the dimensions of the housing 430 and of the interface 432, and the dimensions of the first, second, and third electrical conductors 462, 464, and 474 and spacings therebetween, may be selected for particular fasteners, whether rotatable or otherwise, such that the third electrical conductor 474 is positionable to contact the first and second electrical conductors 462 and 464 when the particular fastener is in a first position, and the third electrical conductor 474 is spaced apart from at least one of the first and second electrical conductors 462 and 464 when the particular fastener is in a second position different from the first position.

The conductivity detector 490 can detect a change (typically a reduction) in conductivity between the first and second electrically conductive leads 480 and 482 resulting from rotation of the interface 432 within the housing 430, and the conductivity detector 490 can thereby detect loosening of the nut 420 on the bolt 440.

In summary, the embodiment shown includes an electrical sensor having conductivity that changes in response to movement, such as loosening, of a nut or other fastener. It will be appreciated that in alternative embodiments, such movement need not be rotational, but an alternative embodiment could detect linear motion. Alternative embodiments also need not be limited to fasteners, but could more generally detect movement of elements in response to changes of conductivity associated with such movements.

Figure 5A:
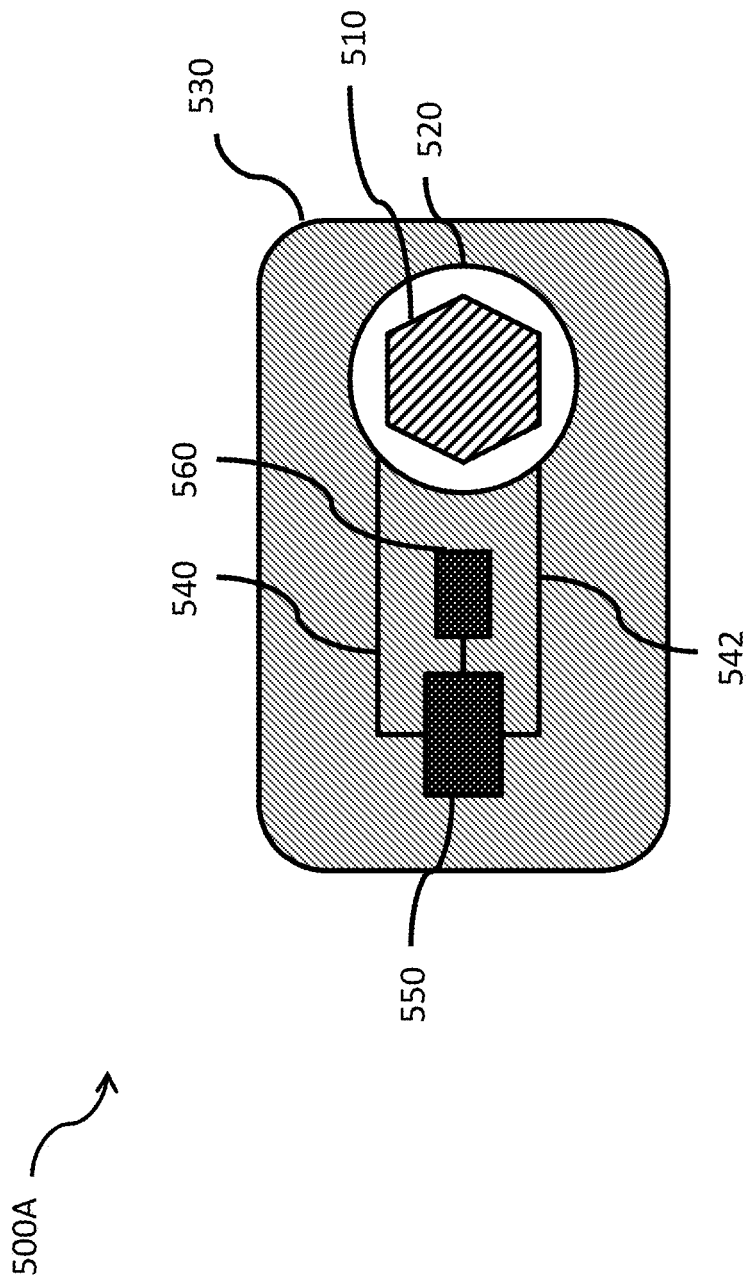
FIG. 5A is a plan view of an embodiment of a "single fastener" sensor assembly.

In the embodiment shown in FIG. 4A, sensor assembly 400 may be referred to as a "single fastener" sensor assembly because the sensor assembly 400 is configured to detect a position of a single nut. FIG. 5A is a plan view of an embodiment of a "single fastener" sensor assembly 500A. The single fastener sensor assembly 500A includes a housing 520 positioned about nut 510. The first and second electrically conductive leads 540 and 542 are connected to a sensor transceiver package 550 which in turn is connected to a power source 560. The single fastener sensor assembly may be fabricated on a substrate 530.

FIG. 5B is a plan view of an embodiment of a "multiple fastener" sensor assembly 500B. The illustrated example shows a sensor assembly for monitoring four nuts 510A-D. The multiple fastener assembly 500B has sensors 520A-D corresponding to the four nuts 510A-D. A sensor transceiver package 550 is connected to monitor sensors 520A-D.

Sensor transceiver package 550 may be connected to sensors 520A-D in various ways. For example, in the illustrated embodiment, electrically conductive leads 540A-E connect the electrical conductors in the four sensors 520A-D in series. Therefore, if any one of the nuts 510A-D becomes loose or otherwise moves sufficiently to break its respective contact bridge, the current detector in sensor transceiver package 550 will detect a reduction in conductivity and will thus detect the loose nut. Sensor transceiver package 550 may identify the loose nut and transmit a signal to the communication module (not shown). The loose nut may be identified for example by measuring a change in an electrical characteristic. The sensors corresponding to each nut may be configured to cause a change in an electrical characteristic indicative of each nut. For example, each sensor may have a different electrical resistance when the contacts of the contact bridge are not touching (this may be provided by a resistor in parallel with the contact bridge, for example or by resistance integrated into the contact bridge). A CPU in sensor transceiver package 550 may compute the identity of the loose nut by means of a look-up table of values for different configurations of loose nuts, for example.

Sensor assemblies and nuts may be assigned unique IDs that may be transmitted by sensor transceiver package 550 as part of the signal to the communication module. Application of sensor assemblies such as 400, 500A and 500B is not limited to monitoring fasteners on the wheels of vehicles or in wind turbines, but may be applied to fasteners such as nuts in a large variety of applications, such as nuts on other elements of machinery, for example. Further, one or more of the sensor assemblies 400, 500A and 500B may be mounted on a substrate to maintain the apparatuses in a convenient single installable or replaceable unit (see for example FIG. 7).

FIGS. 6A-E are views of components of an example sensor assembly comprising an inner interface part 600A, and an outer housing part 600B. Inner interface part 600A can interface to a nut or other fastener and can rotate relative to outer housing part 600B. Electrical contacts can be provided on inner interface part 600A and outer housing part 600B to permit detection of such rotation.

FIGS. 6A and 6B show a plan view and cross-section respectively of the inner interface part 600A with an opening 610 for the nut. The interface part 600A includes material 620 to grip the nut, and a rigid housing 630 for the material 620.

FIGS. 6C and 6D show a plan view and cross-section respectively of the outer housing 600B comprising a rigid snap-together housing 650. FIG. 6D is a cross-section of the outer housing 600B from FIG. 6C taken along the line X-X in FIG. 6C. Referring to FIG. 6E, housing 650 may be made up of parts 650-1 and 650-2 that can be mechanically coupled to enclose inner interface part 600A. For example, parts 650-1 and 650-2 may be configured to snap together i.e. to form a mechanical coupling without the need for any additional parts or material. In alternative embodiments, parts 650-1 and 650-2 may be joined in other ways, for example by suitable adhesives, plastic welding, pins, screws or other fasteners etc.

FIG. 6E illustrates how the outer housing 600B fits together around interface part 600A to form a complete sensor 600.

Electrical contacts forming a contact bridge (not shown in FIGS. 6A to 6C) are provided on outer housing 600B and interface part 600A. Indicia and/or a suitable mechanism may be provided to assist in initial positioning of the contact bridge. For example, one or more magnetic elements may be provided to assist in initial positioning of the contact bridge. The magnetic elements are arranged such that they interact to draw inner interface part 600A to an orientation such that the electrical contacts making up the contact bridge are in a desired initial configuration relative to one another. As a non-limiting example, the magnetic elements may be arranged to draw inner interface part 600A to a position such that the contact bridge is symmetrical (e.g. the third conductor overlaps the first and second conductors equally). A mechanical detent mechanism or bias mechanism which releasably holds and/or biases The electrical contacts making up the contact bridge into a desired initial configuration is another option.

For example, in the illustrated embodiment, inner interface part 600A includes an optional embedded magnetic bridge 640 and outer housing 600B includes two optional embedded magnetic contacts 660 and 662. The magnetic contacts can be integrated with the electrical conductors in a single structure, for example. These components are arranged such that inner interface part 600A is drawn toward a position in which electrical contacts of the contact bridge are in contact with one another.

FIG. 7 is a schematic representation of a complete sensor assembly 700 mounted on a substrate 710. The illustrative example shown in FIG. 7 does not include the magnetic elements 640, 660 and 662 shown in FIGS. 6A-C.

Figure 7A:
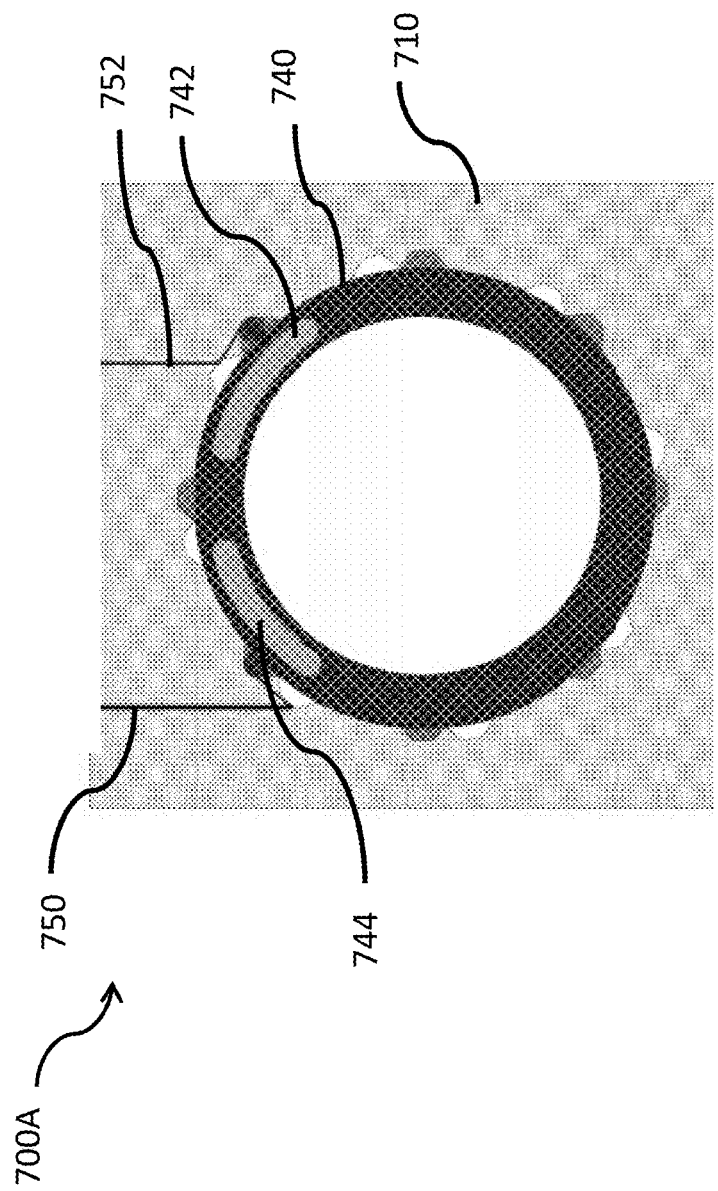
FIG. 7A is a plan view of a schematic representation of a sensor assembly mounted on a substrate.
Figure 7B:
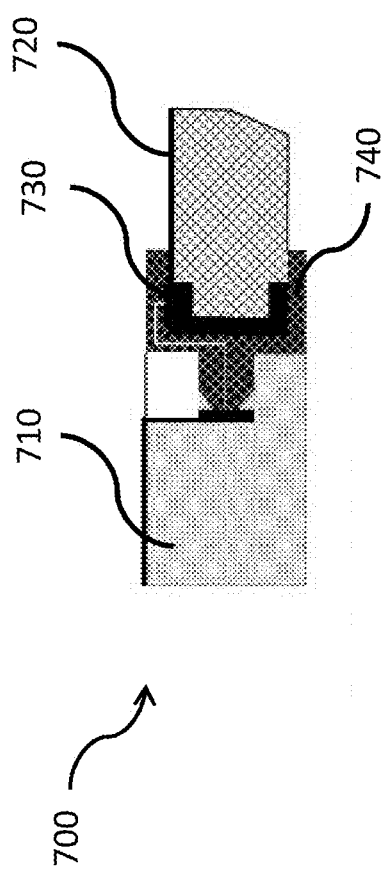
FIG. 7B is a partial cross-section through the centre of the sensor assembly of FIG. 7A.

As shown in FIGS. 7A and 7B, mounting the sensor assembly on a substrate may maintain any suitable number of sensor assemblies in a convenient single installable or replaceable unit. Units may be sized to accommodate any suitable range of nut sizes and any suitable arrangement of nuts. FIG. 7A shows a plan view of sensor assembly 700. FIG. 7B shows a cross-section through the centre of sensor assembly 700 from FIG. 7A.

Referring to FIGS. 7A and 7B, sensor assembly 700 includes substrate 710. The nut (not shown) is gripped by material 720 surrounded by rigid inner housing 730. The outer housing 740 comprises two electrical contacts 742 and 744. The third electrical contact (640 from FIG. 6A) is not visible in FIG. 7A. The sensor assembly is connected to the sensor transceiver package (not shown) via electrically conductive leads or traces 750 and 752.

Referring back to FIG. 3, in the embodiment shown, each of the aforementioned sensor assemblies is in wireless communication with a communication module 380. Communication module 380 may be placed in any suitable location. Communication module 380 should be placed to ensure reliable wireless communication to the sensor assemblies.

In one example embodiment, the sensor assemblies communicate with the communication module 380 using radio signals in a frequency band from about 423 MHZ to about 433 MHz, or at a frequency of about 441 MHz, for example. In another embodiment, the sensor assemblies communicate may with the communication module 380 using radio signals in a frequency band from about 902 MHZ to about 928 MHz, or in a combination of frequency bands such as the aforementioned frequency bands. In some embodiments the radio signals may be in the band 40.66-40.70 and above 70 MHz, or otherwise according to 47 CFR 15.231, for example.

Further, the sensor assemblies and the communication module 380 may be in communication using a CC1110 development kit available from Texas Instruments Incorporated of Dallas, Tex., United States of America. For example, the CC1110 development kit includes SmartRF™04 evaluation boards and CC1110EM 433 MHz evaluation modules that may facilitate wireless communication using Gaussian frequency-shift keying ("GFSK"). Further, "Splatch" antennas (ANT-433-SP) available from Antenna Factor of Merlin, Oreg., United States of America may be suitable for use. For example, such "Splatch" antennas have relatively omni-directional radiation patterns, which may be suitable when incorporated in an apparatus having metallic components, and such "Splatch" antennas may be connected with semi-rigid coaxial cables to modules of the CC1110 development kit. However, wireless connections are not necessary, and in alternative embodiments, one or more of the sensor assemblies may be connected by one or more wires to the communication module 380.

In one embodiment, the sensor assemblies described above cache data retrieved from sensors and transmit such data periodically in periodic operational property signals to the communication module 380. Operating periodically rather than continuously can advantageously reduce battery power consumption of the sensor assemblies. The sensor assemblies may transmit operational property signals in predetermined time intervals of five minutes, for example. Alternatively, the sensor assemblies may be programmed to detect particular error conditions from the sensors (such as a loose nut, for example) and transmit an operational property signal in response to such error conditions immediately and independently of such a predetermined time interval.

In the embodiment shown, the aforementioned sensor assemblies each include a processor circuit programmed to poll a sensor value periodically, and a computer readable memory encoded with program codes to direct the processor circuit to respond to a polling cycle. However, alternative embodiments may include application-specific integrated circuits ("ASICs") or processors that respond to various polling cycles or interrupts, for example.

Figure 8:
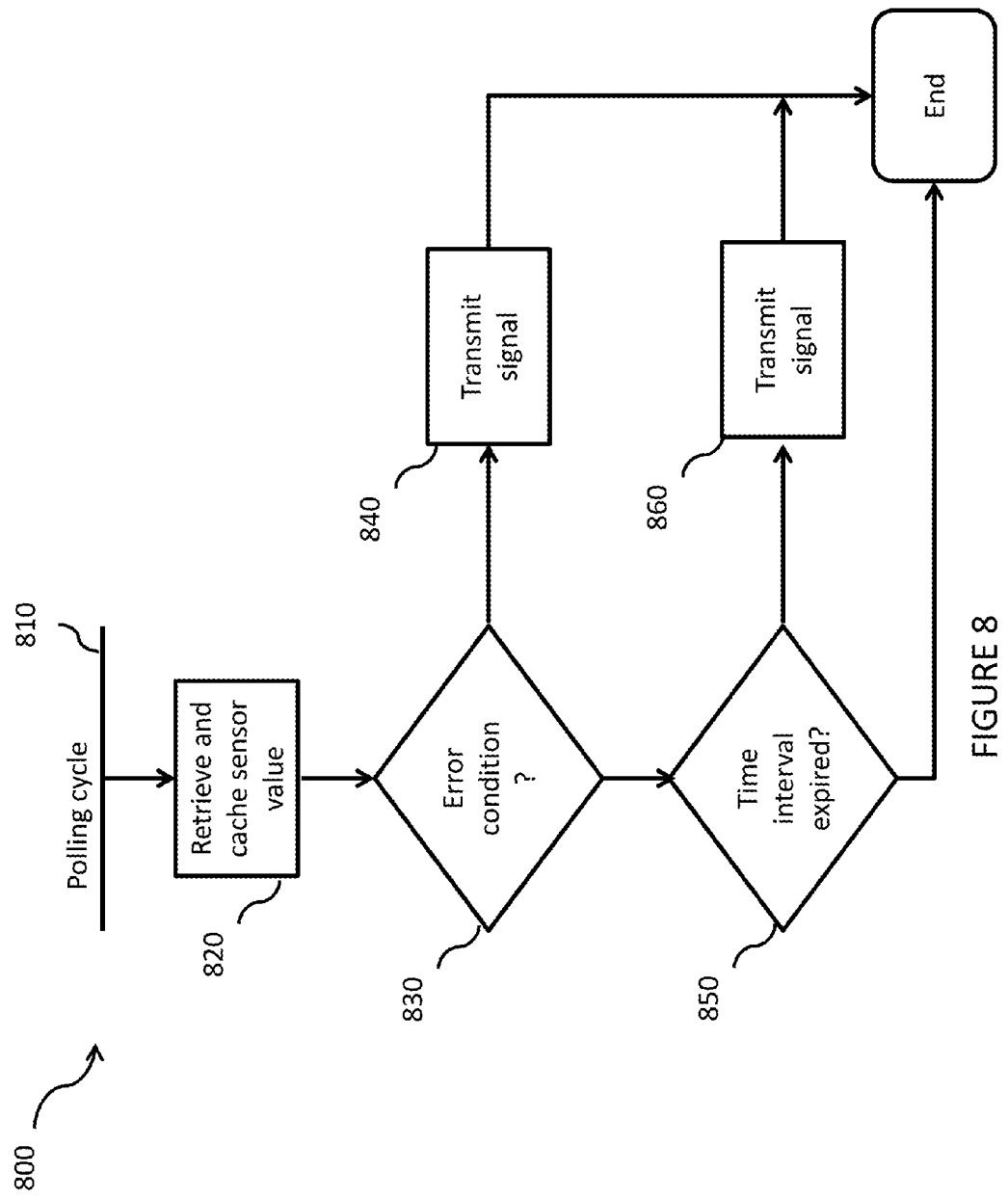
FIG. 8 is a schematic representation of program instructions of a sensor assembly of the wind turbine of FIG. 3.

FIG. 8 shows exemplary program instructions which may be applied, for example, in one sensor assembly. Program instructions are shown schematically and indicated generally at 800. Program instructions 800 include a plurality of blocks of codes generally for instructing the processor circuit to perform a polling cycle. The program instructions 800 in the embodiment shown therefore begins at 810 in response to a particular polling cycle, and continues at block 820, which includes codes for directing the processor circuit to retrieve a value from a sensor of the sensor assembly and cache the retrieved value. The program instructions 800 then continue at block 830, which includes codes for directing the processor circuit to determine whether the retrieved value represents an error condition (such as looseness of a nut). If so, then the program instructions 800 continue at block 840, which includes codes for directing the processor circuit to transmit an operational property signal (such as an alert and/or loose nut ID) immediately to the communication module 380, and the program instructions 800 then end. Otherwise, the program instructions 800 continue at block 850, which includes codes for directing the processor circuit to determine whether a predetermined operational property signal time interval has expired. If not, then the program instructions 800 end. But if at block 850 the predetermined operational property signal time interval has expired, then the program instructions 800 continue at block 860, which includes codes for directing the processor circuit to transmit an operational property signal to the communication module 380, and the program instructions 800 then end at step 870.

In the embodiment shown, when the communication module 380 receives an input operational property signal from a sensor assembly in response to either block 840 or 860, the communication module 380 repeats the operational property signal as an output operational property signal and transmits the output operational property signal to a remote monitoring station 180 shown in FIG. 1A. The remote monitoring station 180 may include supervisory control and data acquisition ("SCADA") software to display data collected from any number of sensor assemblies.

When viewing representations of such data on display unit 140 or at the remote monitoring station 180 from FIG. 1A, an operator of machine 110 may observe error conditions or other undesirable conditions in machine 110, and the operator may then address such conditions in a suitable way, for example by bringing the machine to a halt and inspecting the nuts for looseness.

Sensor assemblies as described above may be battery powered to permit the sensor assemblies to be positioned on moving or remote parts of a machine. It has been found that the sensor assemblies may have radio signal ranges of about 50 meters (or about 164 feet) while maintaining satisfactory battery life. In contrast, the communication module 380 may have a larger battery than the sensor assemblies, or the communication module 380 may have a power source other than a battery. Therefore, the communication module may function as a "hub" of a "zone" of various sensor assemblies, and the zone may be associated with a system such as the wind turbine 300 in the embodiment shown. In alternative embodiments, such a "zone" may be associated with one of a plurality of such systems.

Such a "zone" may be associated with one of many other systems, which are not at all limited to wind turbines. As one non-limiting example, such a system may include a motor vehicle, and in such a system sensor assemblies such as those described herein may measure operational properties such as temperature of such elements, air pressure in one or more tires, or other operational properties such as those described herein.

Although specific embodiments have been described and illustrated, such embodiments should be considered illustrative of the invention only, and not as limiting the invention as construed in accordance with the accompanying claims.

Interpretation of Terms

Unless the context clearly requires otherwise, throughout the description and the claims:

"comprise," "comprising," and the like are to be construed in an inclusive sense, as opposed to an exclusive or exhaustive sense; that is to say, in the sense of "including, but not limited to".

"connected," "coupled," or any variant thereof, means any connection or coupling, either direct or indirect, between two or more elements; the coupling or connection between the elements can be physical, logical, or a combination thereof.

"herein," "above," "below," and words of similar import, when used to describe this specification shall refer to this specification as a whole and not to any particular portions of this specification.

"or," in reference to a list of two or more items, covers all of the following interpretations of the word: any of the items in the list, all of the items in the list, and any combination of the items in the list.

the singular forms "a", "an" and "the" also include the meaning of any appropriate plural forms.

Words that indicate directions such as "vertical", "transverse", "horizontal", "upward", "downward", "forward", "backward", "inward", "outward", "vertical", "transverse", "left", "right", "front", "back", "top", "bottom", "below", "above", "under", and the like, used in this description and any accompanying claims (where present) depend on the specific orientation of the apparatus described and illustrated. The subject matter described herein may assume various alternative orientations. Accordingly, these directional terms are not strictly defined and should not be interpreted narrowly.

Embodiments of the invention may be implemented using specifically designed hardware, configurable hardware, programmable data processors configured by the provision of software (which may optionally comprise 'firmware') capable of executing on the data processors, special purpose computers or data processors that are specifically programmed, configured, or constructed to perform one or more steps in a method as explained in detail herein and/or combinations of two or more of these. Examples of specifically designed hardware are: logic circuits, application-specific integrated circuits ("ASICs"), large scale integrated circuits ("LSIs"), very large scale integrated circuits ("VLSIs") and the like. Examples of configurable hardware are: one or more programmable logic devices such as programmable array logic ("PALs"), programmable logic arrays ("PLAs") and field programmable gate arrays ("FPGAs"). Examples of programmable data processors are: microprocessors, digital signal processors ("DSPs"), embedded processors, graphics processors, math co-processors, and the like. For example, one or more data processors in a control circuit for a machine or other device may implement methods as described herein by executing software instructions in a program memory accessible to the processors.

Processing may be centralized or distributed. Where processing is distributed, information including software and/or data may be kept centrally or distributed. Such information may be exchanged between different functional units by way of a communications network, such as a Local Area Network (LAN), Wide Area Network (WAN), or the Internet, wired or wireless data links, electromagnetic signals, or other data communication channels.

While processes or blocks are presented in a given order, alternative examples may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. In addition, while elements are at times shown as being performed sequentially, they may instead be performed simultaneously or in different sequences.

The invention may also be provided in the form of a program product. The program product may comprise any non-transitory medium which carries a set of computer-readable instructions which, when executed by a data processor, cause the data processor to execute a method of the invention. Program products according to the invention may be in any of a wide variety of forms. The program product may comprise, for example, non-transitory media such as magnetic data storage media including floppy diskettes, hard disk drives, optical data storage media including CD ROMs, DVDs, electronic data storage media including ROMs, flash RAM, EPROMs, hardwired or preprogrammed chips (e.g., EEPROM semiconductor chips), nanotechnology memory, or the like. The computer-readable signals on the program product may optionally be compressed or encrypted.

In some embodiments, the invention may be implemented in software suitably embodied for execution on a data processor. For greater clarity, "software" includes any instructions executed on a processor, and may include (but is not limited to) firmware, resident software, microcode, and the like. Both processing hardware and software may be centralized or distributed (or a combination thereof), in whole or in part, as known to those skilled in the art. For example, software and other modules may be accessible via local memory, via a network, via a browser or other application in a distributed computing context, or via other means suitable for the purposes described above.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Specific examples of systems, methods and apparatus have been described herein for purposes of illustration. These are only examples. The technology provided herein can be applied to systems other than the example systems described above. Many alterations, modifications, additions, omissions and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

It is therefore intended that the following appended claims and claims hereafter introduced are interpreted to include all such modifications, permutations, additions, omissions and sub-combinations as may reasonably be inferred. The scope of the claims should not be limited by the preferred embodiments set forth in the examples, but should be given the broadest interpretation consistent with the description as a whole.

What is claimed is:

1. An apparatus for detecting if a fastener moves from a first position to a different second position relative to an object; the apparatus comprising:
   a first connector for connecting a first side of a contact bridge to the fastener for movement in response to movement of the fastener; and
   a second connector for connecting a second side of the contact bridge to the object to remain stationary relative to the object;
   wherein one of the first and second sides of the contact bridge includes first and second spaced apart electrical conductors, and the other one of the first and second sides of the contact bridge includes a third electrical conductor; and
   wherein, when the first connector connects the first side of the contact bridge to the fastener for movement in response to movement of the fastener, and when the second connector connects the second side of the contact bridge to the object to remain stationary relative to the object, the third electrical conductor is positionable to contact the first and second electrical conductors when the fastener is in the first position, and the third electrical conductor is spaced apart from at least one of the first and second electrical conductors when the fastener is in the second position.

2. The apparatus of claim 1 wherein the first connector comprises an interface couplable to the fastener and the interface defines an inner surface generally complementary to the fastener.

3. The apparatus of claim 2 wherein the fastener is rotatable relative to the object.

4. The apparatus of claim 3 wherein the fastener comprises a nut or a bolt.

5. The apparatus of claim 3 wherein the second connector comprises a housing defining a generally annular inward-facing cavity in which the first connector is positioned for rotation therein.

6. The apparatus of claim 1 wherein the first, second, and third electrical conductors comprise a magnetic material.

7. A sensor assembly comprising:
   the apparatus of claim 1; and
   a detector in electrical communication with the second and third electrical conductors and configured to generate a notification in response to a change in electrical conductivity between the second and third electrical conductors.

8. The sensor assembly of claim 7 wherein the notification comprises a radio frequency signal.

9. The sensor assembly of claim 8 comprising a wireless transmitter connected to transmit a signal comprising the notification to a communication module.

10. The sensor assembly of claim 9 comprising a data processor configured to periodically operate the detector, cache data representing an output of the detector and transmit the cached data periodically in periodic operational property signals a the communication module by way of the wireless transmitter.

11. A system comprising the sensor assembly according to claim 9 and further comprising a communication module configured to receive the operational property signals and transmit an output operational property signal to a data collection apparatus in response to receiving the operational property signals.

12. A sensor assembly comprising:
   a plurality of apparatuses, each one of the plurality of apparatus according to claim 1; and
   a detector in electrical communication with the second and third electrical conductors of each one of the plurality of apparatuses and configured to generate a notification in response to a change in electrical conductivity of any of the apparatuses.

13. The sensor assembly of claim 12 wherein the electrical conductors of each one of the plurality of apparatuses are electrically connected in a series circuit and the detector is connected to monitor electrical conductivity of the series circuit.

14. The sensor assembly of claim 12 wherein the notification comprises a radio frequency signal.

15. The sensor assembly of claim 12 comprising a wireless transceiver connected to transmit a signal comprising the notification to a communication module.

16. The sensor assembly according to claim 12 wherein the plurality of apparatuses are each mounted to a common substrate and the substrate is apertured at positions corresponding to fasteners to be monitored by the plurality of apparatuses.

17. A machine comprising apparatus according to claim 1.

18. The machine of claim 17 wherein the machine is a vehicle or a wind turbine.

19. A method for detecting rotation of a fastener relative to an object, the method comprising:
monitoring electrical conductivity of a contact bridge having first and second sides, the first side coupled to the fastener and the second side coupled to the object, wherein, one of the first and second sides comprises first and second electrical contacts angularly spaced apart by a gap having a first angular width and the other one of the first and second sides comprises a third electrical contact, the third electrical contact having a second angular width greater than the first angular width such that the third electrical contact forms a bridge between the first and second electrical contacts when the fastener is in a first rotational position and the third electrical contact does not bridge between the first and second electrical contacts when the fastener is in a second rotational position different from the first rotational position.

\* \* \* \* \*